US 7,354,653 B2

Apr. 8, 2008

(12) United States Patent
Germroth et al.

(54) HIGH CLARITY FILMS WITH IMPROVED THERMAL PROPERTIES

(75) Inventors: Ted Calvin Germroth, Kingsport, TN (US); Candace Michele Tanner, Kingsport, TN (US); Marc Alan Strand, Kingsport, TN (US); Rodney Layne Piner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/005,352

(22) Filed: Dec. 6, 2004

(65) Prior Publication Data

US 2005/0136271 A1 Jun. 23, 2005

Related U.S. Application Data

(60) Provisional application No. 60/544,296, filed on Feb. 12, 2004, provisional application No. 60/531,757, filed on Dec. 19, 2003, provisional application No. 60/530,802, filed on Dec. 18, 2003.

(51) Int. Cl.
 *B32B 27/06* (2006.01)
(52) U.S. Cl. .................. 428/480; 428/35.7; 428/68; 428/221; 428/480; 524/47; 524/62; 524/275
(58) Field of Classification Search ................ 528/302, 528/308, 308.6, 361; 525/437, 444; 428/35.7, 428/68, 221, 480; 524/47, 62, 275, 451, 524/487, 539, 580
See application file for complete search history.

(56) References Cited

U.S. PATENT DOCUMENTS

| | | |
|---|---|---|
| 2,012,267 A | 8/1935 | Carothers |
| 2,044,612 A | 6/1936 | Jaeger |
| 3,186,961 A | 6/1965 | Sears |
| 3,658,978 A | 4/1972 | Ancker |
| 3,873,496 A | 3/1975 | Hills |
| 3,883,478 A | 5/1975 | Gresham |
| 4,045,431 A | 8/1977 | Fagerburg |
| 4,258,153 A | 3/1981 | Yomamoto et al. |
| 4,340,526 A | 7/1982 | Petke et al. |
| 4,391,938 A | 7/1983 | Memon et al. |
| 4,450,250 A | 5/1984 | McConnell et al. |
| 4,506,043 A | 3/1985 | Ogawa et al. |
| 4,814,426 A | 3/1989 | Utsumi et al. |
| 4,837,254 A | 6/1989 | Branscome |
| 4,873,270 A | 10/1989 | Aime et al. |
| 4,963,418 A | 10/1990 | Isaka et al. |
| 4,996,291 A | 2/1991 | Yoshinaka et al. |
| 5,017,680 A | 5/1991 | Sublett |
| 5,256,714 A | 10/1993 | Liu et al. |
| 5,290,631 A | 3/1994 | Fleury et al. |
| 5,399,595 A | 3/1995 | Sublett et al. |
| 5,484,632 A | 1/1996 | Mercer, Jr. et al. |
| 5,489,470 A | 2/1996 | Noda |
| 5,498,692 A | 3/1996 | Noda |
| 5,502,116 A | 3/1996 | Noda |
| 5,532,049 A | 7/1996 | Masuda et al. |
| 5,534,570 A | 7/1996 | Shih et al. |
| 5,536,564 A | 7/1996 | Noda |
| 5,589,126 A | 12/1996 | Shih et al. |
| 5,602,227 A | 2/1997 | Noda |
| 5,618,855 A | 4/1997 | Noda |
| 5,624,987 A | 4/1997 | Brink et al. |
| 5,654,347 A | 8/1997 | Khemani et al. |
| 5,696,176 A | 12/1997 | Khemani et al. |
| 5,703,160 A | 12/1997 | Dehennau et al. |
| 5,753,782 A | 5/1998 | Hammond et al. |
| 5,766,277 A * | 6/1998 | DeVoe et al. ............. 51/295 |
| 5,817,721 A | 10/1998 | Warzelhan et al. |
| 5,824,398 A | 10/1998 | Shih |
| 5,859,116 A | 1/1999 | Shih |
| 5,900,322 A | 5/1999 | Buchanan et al. |
| 5,928,788 A | 7/1999 | Riedl |
| 5,958,581 A | 9/1999 | Khanarian et al. |
| 5,965,648 A | 10/1999 | Brink et al. |
| 5,998,005 A | 12/1999 | Kanno |
| RE36,548 E | 2/2000 | Noda |
| 6,025,061 A | 2/2000 | Khanarian et al. |
| 6,054,551 A | 4/2000 | Cornell et al. |
| 6,068,910 A | 5/2000 | Flynn et al. |

(Continued)

FOREIGN PATENT DOCUMENTS

DE   100 40 691 A1   2/2002

(Continued)

OTHER PUBLICATIONS

International Search Report dated Apr. 27. 2005, for PCT/US2004/041737.

(Continued)

*Primary Examiner*—Terressa Boykin
(74) *Attorney, Agent, or Firm*—Bernard J. Graves, Jr.; Eric D. Middlemas; Louis N. Moreno

(57) ABSTRACT

Disclosed are high clarity films produced from semicrystalline polyesters by calendering. These films unexpectedly develop a higher peak melting point, which leads to higher thermal resistance. The semicrystalline polyesters may be biodegradable. When these calendered films are oriented, they develop unexpectedly high physical strength or clarity in comparison to films that are prepared by conventional techniques.

22 Claims, No Drawings

U.S. PATENT DOCUMENTS

| | | | |
|---|---|---|---|
| 6,077,931 A | 6/2000 | Noda | |
| 6,103,857 A | 8/2000 | Jones et al. | |
| 6,114,431 A | 9/2000 | Lee et al. | |
| 6,127,512 A | 10/2000 | Asrar et al. | |
| 6,160,199 A | 12/2000 | Noda | |
| 6,174,990 B1 | 1/2001 | Noda | |
| 6,231,970 B1 | 5/2001 | Anderson et al. | |
| 6,303,677 B1 | 10/2001 | Warzelhan et al. | |
| 6,326,435 B1 | 12/2001 | Takayama et al. | |
| 6,350,530 B1 | 2/2002 | Morikawa et al. | |
| 6,482,872 B2 | 11/2002 | Downie | |
| 6,551,688 B2 | 4/2003 | Moskala et al. | |
| 6,551,699 B1 | 4/2003 | Flynn | |
| 6,569,990 B1 | 5/2003 | Noda | |
| 6,620,869 B2 | 9/2003 | Asrar et al. | |
| 6,632,390 B1 | 10/2003 | Shelby et al. | |
| 6,787,245 B1 | 9/2004 | Hayes | |
| 2001/0027225 A1 | 10/2001 | Downie | |
| 2002/0061944 A1 | 5/2002 | Asrar et al. | |
| 2003/0060542 A1 | 3/2003 | Witt et al. | |
| 2003/0145518 A1 | 8/2003 | Noda et al. | |
| 2003/0171471 A1 | 9/2003 | Pritschins et al. | |
| 2003/0187149 A1 | 10/2003 | Schmidt et al. | |
| 2003/0212244 A1 | 11/2003 | Hayes et al. | |
| 2004/0024101 A1 | 2/2004 | Hayes | |
| 2004/0024102 A1 | 2/2004 | Hayes et al. | |
| 2004/0039092 A1 | 2/2004 | Asrar et al. | |
| 2004/0068059 A1 | 4/2004 | Katayama et al. | |
| 2004/0152810 A1 | 8/2004 | Takenaka et al. | |

FOREIGN PATENT DOCUMENTS

| | | |
|---|---|---|
| EP | 0 724 947 A1 | 8/1996 |
| EP | 0 744 439 A1 | 11/1996 |
| EP | 0 484 818 | 1/1997 |
| EP | 0 965 615 A1 | 12/1999 |
| EP | 1 054 038 A1 | 11/2000 |
| EP | 1 375 556 A2 | 2/2004 |
| EP | 1 529 808 A2 | 5/2005 |
| EP | 1 529 809 A1 | 5/2005 |
| GB | 805 586 A | 12/1958 |
| GB | 805 587 | 12/1958 |
| GB | 805 588 A | 12/1958 |
| GB | 815 991 | 7/1959 |
| GB | 1 323 478 | 9/1973 |
| JP | 1-138260 A | 5/1989 |
| JP | 1-49741 B2 | 10/1989 |
| JP | 8-142290 A | 11/1990 |
| JP | 10-291225 A | 11/1990 |
| JP | 4-62144 | 2/1992 |
| JP | 4-117432 | 4/1992 |
| JP | 4-166309 | 6/1992 |
| JP | 5-271397 A | 10/1993 |
| JP | 7-60924 A | 3/1995 |
| JP | 7-278418 A | 10/1995 |
| JP | 8-283547 A | 10/1996 |
| JP | 9-40823 A | 2/1997 |
| JP | 9-66590 A2 | 3/1997 |
| JP | 9-217014 | 8/1997 |
| JP | KOKAI 9-217014 * | 8/1997 |
| JP | 9-272191 A | 10/1997 |
| JP | 11-158358 A | 6/1999 |
| JP | 2-986197 | 10/1999 |
| JP | 11-343353 A | 12/1999 |
| JP | 2000-136294 A | 5/2000 |
| JP | 2000-302951 A | 10/2000 |
| JP | 2000-327891 | 11/2000 |
| JP | 2000-336256 A | 12/2000 |
| JP | 2001-18344 A | 1/2001 |
| JP | 2001-40197 | 2/2001 |
| JP | 2001-64496 A | 3/2001 |
| JP | 2001-214044 A | 8/2001 |
| JP | 2001-279068 A | 10/2001 |
| JP | 2001-302833 A | 10/2001 |
| JP | 2001-354842 A | 12/2001 |
| JP | 2002-53740 A | 2/2002 |
| JP | 2002-53741 A | 2/2002 |
| JP | 2002-121362 A | 4/2002 |
| JP | 2002-129002 A | 5/2002 |
| JP | 2002-129483 A | 5/2002 |
| JP | 2000-186191 A | 7/2002 |
| JP | 2002-275217 A | 9/2002 |
| JP | 2002-294043 A | 10/2002 |
| JP | 2003-20386 A | 1/2003 |
| JP | 2003-128773 A | 5/2003 |
| JP | 2003-128889 A | 5/2003 |
| JP | 2003-128890 A | 5/2003 |
| JP | 2003-128894 A | 5/2003 |
| JP | 2003-154539 A | 5/2003 |
| JP | 2003-155401 A | 5/2003 |
| JP | 2003-155402 A | 5/2003 |
| JP | 2003-171537 A | 6/2003 |
| JP | 2003-191266 A | 7/2003 |
| JP | 2003-201391 A | 7/2003 |
| JP | 2003-277592 A | 10/2003 |
| JP | 2004-143353 A | 5/2004 |
| JP | 2001-200146 A | 7/2004 |
| JP | 2004-182759 A | 7/2004 |
| JP | 2004-238534 A | 8/2004 |
| JP | 2005-8771 A | 1/2005 |
| WO | WO 87/03291 A | 6/1987 |
| WO | WO 94/28061 A1 | 12/1994 |
| WO | WO 95/14734 | 6/1995 |
| WO | WO 95/20614 | 8/1995 |
| WO | WO 97/10302 | 3/1997 |
| WO | WO 97/42260 | 11/1997 |
| WO | WO 97/49757 A | 12/1997 |
| WO | WO 99/23146 | 5/1999 |
| WO | WO 99/47605 A | 9/1999 |
| WO | WO 00/37544 A1 | 6/2000 |
| WO | WO 01/85451 A1 | 11/2001 |
| WO | WO 02/28967 A1 | 4/2002 |
| WO | WO 2004/029147 A1 | 4/2004 |
| WO | WO 2004/060990 A2 | 7/2004 |

OTHER PUBLICATIONS

International Search Report dated Apr. 27, 2005, for PCT/US2004/041638.

Database WPI, Section CH, Week 9702, XP-002106151, Derwent Publications, Ltd., Oct. 29, 1996, London, GB.

Jim Butschli, Packaging World, pp. 26-28, Jun. 1997.

W.V. Titow, PVC Technology, 4th Edition, pp. 803-848 (1984), Elsevier Publishing Co.

Material Safety Data Sheet, "EASTAR" PETG Copolyester 6763, Oct. 23, 1997.

Anonymous Research Disclosure 23314, Sep. 1983.

Fox equation, T.G. Fox, Bull. Am. Phys. Soc., 1, 123 (1956).

"The Technology of Plasticizers", by J. Kern Sears and Joseph R. Darby, published by Society of Plastic Engineers/Wiley and sons, New York, 1982, pp. 134-137.

Coleman et al., Polymer 31, (1990), 1187-1203.

Elias, H. *Macromolecules,* Plenum Press: NY, 1977, p. 390-394.

Bastioli, Castia, "Starch-polymer composites", *Degradable Polymers,* Chapman & Hall:London, 1995, pp. 112-137.

John Davis, Flame retardants: halogen-free systems (including phosphorus additives), Plastics Additives: An A-Z Reference, 1998, pp. 278-286, Chapman & Hall, London.

* cited by examiner

HIGH CLARITY FILMS WITH IMPROVED THERMAL PROPERTIES

CROSS REFERENCES TO RELATED APPLICATIONS

This application claims the benefit of U.S. Provisional Application Ser. Nos. 60/530,802, filed Dec. 18, 2003; 60/531,757, filed Dec. 19, 2003; and 60/544,296, filed Feb. 12, 2004.

FIELD OF THE INVENTION

This invention generally relates to films made by calendering semicrystalline polyesters. The invention also generally relates to films made by orienting calendered, semicrystalline polyesters films. These films can exhibit improved strength, clarity, and thermal resistance.

BACKGROUND OF THE INVENTION

Calendering is an economic and highly efficient means to produce film and sheet from plastics. These films and sheets usually have a thickness ranging from about 1 mil (0.025 mm) to about 80 mils (2 mm). They are readily thermoformed into various shapes that are used for a variety of packaging applications. For example, calendered poly(vinyl chloride) film or sheet ("PVC") can be used in a wide range of applications including pool liners, graphic arts, transaction cards, security cards, veneers, wall coverings, greenhouse glazing, book bindings, folders, floor tiles, and products that are printed or decorated or laminated in a secondary operation.

Although PVC has been used for over sixty years, it presents disposal and environmental problems that have created a need for alternative, environmentally-friendly materials. For example, PVC emits toxic byproducts when incinerated and is persistent in the environment. Although PVC compositions are by far the largest segment of the calendered film and sheet business, small amounts of other thermoplastic polymers such as thermoplastic rubbers, certain polyurethanes, talc-filled polypropylene, acrylonitrile/-butadiene/styrene terpolymers (abbreviated herein as "ABS"), and chlorinated poly-ethylene are sometimes processed by calendering methods. Attempts to calender polyester polymers such as poly(ethylene terephthalate) (abbreviated herein as "PET") or poly(1,4-butylene terephthalate) (abbreviated herein as "PBT") have not been successful. For example, PET polymers with inherent viscosity values of about 0.6 dL/g have insufficient melt strength to perform properly on the calendering rolls. PET also crystallizes rapidly and uncontrollably when fed to calendering rolls at typical processing temperatures and forms a non-homogeneous mass which is unsuitable for further processing. This non-homogeneous mass causes undesirable, high forces on the calender bearings. During processing, the tendency of polyester polymers to hydrolyze on rolls open to ambient conditions and at the high temperatures required to produce polymer melts also can be a concern. Typical PET polymers without the inclusion of process lubricants or internal release additives also have a tendency to stick to the calendering rolls at typical processing temperatures. The calendering of various copolyester compositions and several approaches to these problems has been described, for example, in U.S. Pat. Nos. 5,998,005; 6,068,910; 6,551,688; U.S. patent application Ser. No. 10/086,905; Japan Patent Application No.'s 8-283547; 7-278418; 9-217014; 2002-53740; 10-363-908; 2002-121362; 2003-128894; 11-158358; European Patent Application No. 1 375 556 A2; and World Patent Application No. 02/28967. Although some of these difficulties can be avoided by the careful selection of polymer properties, additives, and processing conditions, calendering of polyesters can be troublesome or heretofore impossible or impractical.

Conventional processing of polyesters into film or sheet involves extruding a polyester melt through a manifold of a flat die. Manual or automatic die lip adjustment is used to control thickness across a web of material. Water-cooled chill rolls are used to quench the molten web and impart a smooth surface finish. Extrusion processes, while producing film and sheet of excellent quality, do not have the throughput and economic advantages that are provided by calendering processes. Also, the gauge tolerance in a calender process is better than in extrusion. Moreover, extruded films produced from aliphatic-aromatic polyesters such as, for example, ECOFLEX® Copolyester (available from BASF Corporation), other similar biodegradable resins, and blends of these resins typically have poor optical properties, i.e., generally not clear, but may exhibit improved clarity on contact with surfaces. The poor clarity, in part, is the result of anti-block additives that are required to successfully process these resins using the conventional processing technologies such as melt-casting and melt-blowing. Such poor clarity makes these films unacceptable for many commercial applications. Films prepared by conventional methods from biodegradable polymers also tend to have poor strength and tear easily. These films, therefore, lack the toughness necessary for many applications such as, for example, trash bags.

Polymers experience a thermal transition known as the glass transition temperature or Tg. Articles made from polymers that exhibit a Tg at or below room temperature, typically, are considered flexible. In general, the further the Tg is below room temperature, the more flexible the polymer will be. For commercial applications requiring polymers of higher flexibility and increased soft feel, a lower Tg is usually obtained by utilizing or designing polymers with an inherently lower Tg such as, for example, polyethylene, or using an additive such as, for example, a plasticizer, that can reduce the Tg to the desired temperature. For example, polyesters typically require the presence of a plasticizer to attain the flexibility needed for many film applications.

The preparation of polymers with an inherently lower Tg can be accomplished with the proper selection of monomers. In some cases, however, the resulting polymer will lose important characteristics. One of these relates to the surface character of the film or article. Typically, as Tg is lowered, there is an increase of surface tackiness that results in an increase in adhesion to surfaces. Consequently, articles and films made with low Tg materials will stick to themselves, even to the point of coalescing or fusing the articles or films into one mass. One way to overcome this problem is to incorporate an "anti-blocking" additive such as, for example, a mineral or higher Tg polymer, that presents itself at the polymer surface and provides a new surface on the film or article with the adhesion characteristics of the additive. Antiblocking additives, however, sometimes reduce the clarity of the calendered film and are often undesirable for many packaging applications.

The presence of a plasticizer in calendered films also is frequently undesirable in some applications. For example, the concentration of plasticizer in polyester films may gradually decrease, either through volatile or extractive loss, which may cause an unacceptable, gradual change in the physical properties of the films. The plasticizer also may cause contamination of the vapor or liquid in contact with the film. Many plasticizers degrade slowly in the environment and, thus, present environmental concerns in addition to the litter problem discussed above. Hence, producing a flexible film without plasticizer is desirable and, eventually, may be required in some film applications.

The shortcomings discussed above, therefore, have created a need for flexible, calendered films and sheets that exhibit high clarity, high thermal resistance, and superior toughness that do not require added plasticizers or anti-blocking agents. Further, there is a need for high clarity, thermally resistant, flexible films that are biodegradable in the environment. Such films have applications as packaging materials, waste and trash bags, and agricultural films as well as many other applications which require the advantages noted above.

SUMMARY OF THE INVENTION

We have surprisingly discovered that semicrystalline polyesters may be calendered at a temperature at which the polyester is partially melted and retains some of its crystallinity to form films with unexpectedly high clarity, toughness, and which have a higher thermal resistance than melt cast films having substantially the same composition. Thus, a general embodiment of our invention is a film comprising one or more semicrystalline polyesters and a release additive wherein the film is formed by a calendering process at a maximum temperature below the upper temperature of the melting point range of each of the polyesters. For example, our film may be formed by calendering one polyester or a blend of polyesters. The calendering process typically may be carried out at any temperature below the upper temperature of the melting point range of each polyester. In another embodiment, the calendering process is conducted at a maximum temperature that is within the melting point range of each of the polyesters. The calendered films can have a higher thermal resistance, lower haze, and higher peak melting temperature than a melt-cast film comprising the same polyester.

The films of the invention may be prepared by calendering without the use of a plasticizer or antiblocking additives. Thus, in another embodiment of the invention, the film or sheet is substantially free of plasticizer. The polyesters used for the preparation of the film or sheet may also may comprise biodegradable polyesters such as, for example, one or more, linear or branched aliphatic-aromatic polyesters (abbreviated herein as "AAPE"), polycaprolactone, polylactic acid, polyhydroxybutyrate, polyhydroxybutyrate-valerate, or polybutylenesuccinate polymers, blends of these polymers, or copolymers thereof. For example, in one embodiment of the invention, the biodegradable polyester comprises adipic acid residues and 65 mole percent or less of terephthalic acid residues and 1,4-butanediol residues. The films of invention may further include additives such as, for example, starch or talc.

When these calendered films are oriented, they develop physical strength and improvements in clarity that are unexpectedly high compared to films that are prepared conventionally such as by melt-casting or melt-blowing. Accordingly, a further aspect of the present invention is an oriented film comprising one or more polyesters and a release additive wherein the oriented film is formed by a calendering process at a maximum temperature below the upper limit of the melting point range of each of the polyesters.

The films of the present invention can have optical and physical properties that make them suitable as a replacement for some plasticized PVC films, but with the benefit of that the films may be produced without the use of plasticizers and/or anti-blocking additives, and can be biodegradable. Other potential uses of these improved films include, but are not limited to, packaging films, shrink films, waste/trash bag, and agricultural films. The films are readily thermoformed into various shapes for specific packaging applications for both food and non-food products. They may be printed with a wide variety of inks and may be laminated either in-line or off-line with fabrics or other plastic film or sheet. Some specific end uses include graphic arts, transaction cards, greenhouse glazing, security cards, veneers, wall coverings, book bindings, folders and the like.

DETAILED DESCRIPTION OF THE INVENTION

The present invention relates to a calendered film comprising one or more polyesters and a release additive wherein the film is formed by a calendering process at a maximum temperature below the upper temperature of the melting point range of each of the polyesters. The film exhibits excellent flexibility, clarity, and toughness and does not require the use of a plasticizer or anti-blocking agent. The films of the invention may be prepared from biodegradable polyesters and thus, can be biodegradable as well. The calendered films can have a thickness in the range of about 1 mil (0.025 mm) to about 80 mils (2 mm).

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint (s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The term "calender" and its various forms such as "calendering" and "calendered", as used herein, refer to any process that uses two or more rolls to form a film or sheet from a molten or partially molten polymer. The term "calendering", as used in the context of the present invention, means that the primary film forming step is from feeding a "bank" of molten or partially molten polymer in the form of a fused mass through two or more calendering rolls. By contrast "calendering" is not intended to include "finish calendering", for example, in which a preformed film is further subjected to embossing or polishing using two more or more additional rolls.

The term "biodegradable", as used herein, means that the referenced polyester or substance can degrade under environmental influences in an appropriate and demonstrable time span as defined, for example, by ASTM Standard Method D6340-98, entitled "Standard Test Methods for Determining Aerobic Biodegradation of Radio Labeled Plastic Materials in an Aqueous or Compost Environment" or by DIN Standard 54900.

The term "polyester", as used herein, is intended to include "copolyesters". In general, polyesters are synthetic polymers prepared by the polycondensation of one or more difunctional carboxylic acids with one or more difunctional hydroxyl compounds. Typically, the difunctional carboxylic acid is a dicarboxylic acid or a hydroxycarboxylic acid, and the difunctional hydroxyl compound is a dihydric alcohol such as, for example, glycols and diols. Alternatively, the polyesters of the invention can be formed via a ring opening reaction of a cyclic lactones; for example, as in polylactic acid prepared from its cyclic lactide or polycaprolactone formed from caprolactone. The term "aliphatic-aromatic polyester", as used herein, means a polyester comprising a mixture of residues from aliphatic or cycloaliphatic dicarboxylic acids or diols and aromatic dicarboxylic acids or diols.

The term "non-aromatic", as used herein with respect to the dicarboxylic acid, diol, and hydroxycarboxylic acid monomers of the present invention, means that carboxyl or hydroxyl groups of the monomer are not connected through an aromatic nucleus. For example, adipic acid contains no aromatic nucleus in its backbone, i.e., the chain of carbon atoms connecting the carboxylic acid groups; thus, it is "non-aromatic". By contrast, the term "aromatic" means the dicarboxylic acid or diol contains an aromatic nucleus in the backbone such as, for example, terephthalic acid or 2,6-naphthalene dicarboxylic acid. "Non-aromatic", therefore, is intended to include both aliphatic and cycloaliphatic structures such as, for example, diols, diacids, and hydroxycarboxylic acids, that contain as a backbone a straight or branched chain or cyclic arrangement of the constituent carbon atoms which may be saturated or paraffinic in nature, unsaturated (i.e., containing non-aromatic carbon-carbon double bonds), or acetylenic (i.e., containing carbon-carbon triple bonds). Thus, in the context of the description and the claims of the present invention, non-aromatic is intended to include linear and branched, chain structures (referred to herein as "aliphatic") and cyclic structures (referred to herein as "alicyclic" or "cycloaliphatic"). The term "non-aromatic", however, is not intended to exclude any aromatic substituents that may be attached to the backbone of an aliphatic or cycloaliphatic diol or diacid or hydroxycarboxylic acid. In the present invention, the difunctional carboxylic acid may be an aliphatic or cycloaliphatic dicarboxylic acid such as, for example, adipic acid, or an aromatic dicarboxylic acid such as, for example, terephthalic acid. The difunctional hydroxyl compound may be cycloaliphatic diol such as, for example, 1,4-cyclohexanedimethanol, a linear or branched aliphatic diol such as, for example, 1,4-butanediol, or an aromatic diol such as, for example, hydroquinone.

The term "residue", as used herein, means any organic structure incorporated into a polymer through a polycondensation or ring opening reaction involving the corresponding monomer. The term "repeating unit", as used herein, means an organic structure having a dicarboxylic acid residue and a diol residue or hydroxycarboxylic acid residues bonded through a carbonyloxy group. Thus, the dicarboxylic acid residues may be derived from a dicarboxylic acid monomer or its associated acid halides, esters, salts, anhydrides, or mixtures thereof. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester. "Hydroxycarboxylic acid" is intended to include aliphatic and cycloaliphatic hydroxycarboxylic acids as well as monohydroxy-monocarboxylic acids and any derivative thereof, including their associated acid halides, esters, cyclic esters (including dimers such as lactic acid lactides), salts, anhydrides, mixed anhydrides, or mixtures thereof, useful in a polycondensation process or ring opening reaction to make a high molecular weight polyester.

The polyesters of our novel film are semicrystalline polymers. The term "semicrystalline", as used herein, means that the polymer contains two phases: an ordered crystalline phase and an unordered amorphous phase. Polyesters with a semicrystalline morphology exhibit both a crystalline melting temperature (Tm) and a glass transition temperature (Tg) and may be distinguished from "amorphous" polymers, which exhibit only a glass transition temperature. The presence of a glass transition temperature and a crystalline melting point are techniques often used to characterize semicrystalline and amorphous polymers. The two thermal transitions, Tg and Tm, can be quantitatively determined by measuring changes in specific volume and heat capacity through well known analytical procedures such as differential scanning calorimetry (DSC). For example, Tg and Tm may be measured with a TA Instruments Model 2920 Differential Scanning Calorimeter programmed to scan at a rate of 20° C./min. The midpoint of the endothermic transition was considered to be the Tg. Tm was considered to be the temperature at the apex of the endothermic peak. These techniques are described more fully in *Thermal Characterization of Polymeric Materials*, edited by Edith A. Turi (published 1981 by Academic Press, New York, N.Y.).

The polyesters used in the present invention typically are prepared from dicarboxylic acids and diols which react in substantially equal proportions and are incorporated into the polyester polymer as their corresponding residues or from cyclic esters (e.g., lactones) via ring opening reactions. The polyesters derived from dicarboxylic acid and diol residues of the present invention, therefore, contain substantially equal molar proportions of acid residues (100 mole %) and diol residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a copolyester containing 30 mole % adipic acid, based on the total acid residues, means that the copolyester contains 30 mole % adipic residues out of a total of 100 mole % acid residues. Thus, there are 30 moles of adipic residues among every 100 moles of acid residues. In another example, a copolyester containing 30 mole % 1,6-hexanediol, based on the total diol residues, means that the copolyester contains 30 mole % 1,6-hexanediol residues out of a total of 100 mole % diol residues. Thus, there are 30 moles of 1,6-hexanediol residues among every 100 moles of diol residues.

In one aspect of the invention, the polyesters may be random copolymers, meaning that the polyester comprises more than one diol, hydroxycarboxylic acid, and/or diacid residues in which the different residues are randomly distributed along the polymer chain, or "homopolymers", meaning the polyester is made up substantially of a single diacid-diol or hydroxycarboxylic acid repeating unit. The polyesters, however, are not "block copolymers", that is, polyesters in which blocks of one homopolymer structure are attached to blocks of another type of homostructure polymer. The polyesters of the invention also may be a blend of a two or more polyesters such that each polyester is in the form of a semicrystalline melt during the calendering process. In another one embodiment, however, the polyesters of our invention are not blends.

In another embodiment, the polyesters of our inventive film may have a crystallization half time from a molten state of less than 5 minutes. The crystallization half time may be, for example, less than 4 minutes, and less than 3 minutes.

The crystallization half time of the polyester, as used herein, may be measured using methods well-known to persons of skill in the art. For example, the crystallization half time may be measured using a Perkin-Elmer Model DSC-2 differential scanning calorimeter. The crystallization half time is measured from the molten state using the following procedure: a 15.0 mg sample of the polyester is sealed in an aluminum pan and heated to 290° C. at a rate of about 320° C./min for 2 minutes. The sample is then cooled immediately to the predetermined isothermal crystallization temperature at a rate of about 320° C./minute in the presence of helium. The isothermal crystallization temperature is the temperature between the glass transition temperature and the melting temperature that gives the highest rate of crystallization. The isothermal crystallization temperature is described, for example, in Elias, H. *Macromolecules*, Plenum Press: NY, 1977, p 391. The crystallization half time is determined as the time span from reaching the isothermal crystallization temperature to the point of a crystallization peak on the DSC curve.

The film of this invention comprises a polyester and a release additive effective to prevent sticking of the polyester to the calender rolls. The polyester is sufficiently flexible that it may be calendered without the addition of plasticizer. Thus, in one example of the invention, the polyester is substantially free of plasticizer. The term "plasticizer", as used herein, is intended to have its ordinary meaning as understood by a person of ordinary skill in the art, that is, an organic compound added to a high polymer both to facilitate processing and to increase the flexibility and toughness of the final product by internal modification or solvation of the polymer molecule. In general, plasticizers lower the Tg of a polymer. The term "substantially free", is intended to mean that the polymer contains no plasticizer in addition or cumulative to the release additive, flame retardants, and typical additives such as, for example, antioxidants, colorants, pigments, fillers, chain extenders, and processing aids, that may be included in the polyester composition, film, and sheet of the present invention. Some of these additives, depending on their structure and miscibility with the polyester, may impart a plasticizing effect on the copolyester. Thus, by "substantially free", it is meant that no compounds, in addition to the typical additive examples listed above, are present in the polyester composition specifically for the purpose of plasticizing or increasing the flexibility of the polyester or the film and sheet produced therefrom. In another embodiment of the invention, the film consists essentially of a polyester and a release additive. Thus, the film of the invention may be prepared by simply calendering a single polyester resin and a release additive at a maximum temperature wherein the polyester is in the form of a semicrystalline melt, meaning that the maximum temperature of the calendering process is below the upper temperature of the melting range for each polyester. In one embodiment, for example, the film may be formed by calendering a polyester at a maximum temperature that is within melting point range of the polyester. If the film comprises a blend of 2 or more polyester polymers, then the film may be formed by calendering the blend at a maximum temperature that is below the upper temperature of the melting point range for each polyester or, in another embodiment, within the melting point range of each polyester. The phrase "consisting essentially of" is used herein is intended to encompass a film in which a polyester resin and a release agent are calendered at a temperature in which the polyester is in the form of a semicrystalline melt and is understood to exclude any elements that would substantially alter the essential properties of the film to which the phrase refers. For example, the films and polyesters of this invention may include other additives such as, for example, flame retardants, antioxidants, colorants, etc. which do not alter the semicrystalline melt phase of the polyester during the calendering process. By contrast, the addition of a plasticizer or another polymer to the polyester which would be expected to alter the melt phase properties of the polyester such that the polyester was not itself in a semicrystalline melt would be excluded from the invention. In a further example, blends of polyesters are intended to be excluded if any one of the polyesters is not in a semicrystalline melt such as, for example, if one polyester was completely melted (i.e., calendered at a temperature above the upper temperature of its melting range) and the other was in the form of a solid suspended in the melted polymer. The following discussion provides examples of the kinds of modifications that may be employed, but those of skill in the art will readily recognize others.

The film of our novel invention is formed by a calendering process at a maximum temperature in which each of the polyesters of the film is in the form of a semicrystalline melt. The term "semicrystalline melt", as used herein, is intended to mean that the polyester exhibits both a liquid, melted phase and a solid, crystalline phase during the calendering operation. A semicrystalline melt is present when the calendering operation is conducted at a temperature that exceeds the Tg of the polyester but is less than the upper temperature of the melting point range of the polyester such that the crystalline regions of the polymer are not completely melted. The term "melting point range", as used herein, means the range of temperature as observed in a DSC curve beginning at the onset of the melting point endotherm and ending at the completion of the melting point endotherm. The onset and completion of the melting point range for a polymer may be determined by persons of ordinary skill in the art. The beginning and end points of the melting point range of the polyesters of the invention are determined by the minimum temperature range wherein 90% of the heat of fusion of the melt is included in the range. The heat of fusion of the melt may be determined in the second heat cycle DSC using standard methods. For example, the heat of fusion and the minimum temperature range may be determined by integrating the area under the second heat cycle DSC curve using a computer and commercially available software well known to persons of ordinary skill in the art. Typically, the calendering process is conducted by carefully maintaining the calender roll temperatures such that the maximum temperature of all of the calender rolls is less than the upper temperature of the melting point range of the polyester or of each polyester if a blend of 2 or more polyesters is used. By contrast, if the temperature of the calendering process exceeds the melting point range of the polyester, the polyester will become completely melted and will not be in the form of a semicrystalline melt. If the calendering temperature is too far below the melting point range of one or more of the polyesters, the viscosity of the melt often will be too high and melt fracture of the film may occur. Typically, the process of the invention is carried out at a maximum temperature of about 70 to about 170° C. Further examples of calendering temperatures include about 80 to about 160° C. and about 90 to about 150° C.

The film of the invention may be formed using any semicrystalline polyester including, but not limited to biodegradable, semicrystalline polyesters. Examples of biodegradable polyesters which may be used in the present invention include, but are not limited to, one or more linear or branched, aliphatic-aromatic random polyesters (AAPE), polycaprolactone, polylactic acid, polyhydroxybutyrate, polyhydroxybutyrate-valerate, and polybutylenesuccinate, and copolymers thereof. For example, the biodegradable polyester may comprise the residues of one or more hydroxycarboxylic acids such as, for example, lactic acid (both R and S forms and mixtures thereof), lactones such as, for example, caprolactone and gamma-butyrolactones, hydroxyalkanoates such as, for example, hydroxybutyrates.

By the term "biodegradable", as used herein in reference to the polyesters, polyester compositions, film and sheet, and additives of the present invention, means that film of the invention and its polyester and additive components are degraded under environmental influences in an appropriate and demonstrable time span as defined, for example, by ASTM Standard Method, D6340-98, entitled "Standard Test Methods for Determining Aerobic Biodegradation of Radiolabeled Plastic Materials in an Aqueous or Compost Environment" or, alternatively, by DIN Method 54900. The polyester, composition, film and sheet, are initially reduced in molecular weight in the environment by the action of heat, water, air, microbes and other factors. This reduction in molecular weight results in a loss of physical properties (film strength) and often in film breakage. Once the molecular weight of the biodegradable polyester is sufficiently low, the monomers and oligomers are then assimilated by the microbes. In an aerobic environment, these monomers or oligomers are ultimately oxidized to $CO_2$, $H_2O$, and new cell biomass. In an anaerobic environment, the monomers or oligomers are ultimately converted to $CO_2$, $H_2$, acetate, methane, and cell biomass. Successful biodegradation requires that direct physical contact must be established between the biodegradable material and the active microbial population or the enzymes produced by the active microbial population. An active microbial population useful for degrading the films, sheets, polyesters, and polyester compositions of the invention can generally be obtained from any municipal or industrial wastewater treatment facility or composting facility. Moreover, successful biodegradation requires that certain minimal physical and chemical requirements be met such as suitable pH, temperature, oxygen concentration, proper nutrients, and moisture level.

The film of our invention may be further described and illustrated herein with particular reference to aliphatic-aromatic polyesters (abbreviated herein as "AAPE"). The AAPE may be a linear, random polyester or a branched and/or chain extended polyester comprising diol residues which contain the residues of one or more substituted or unsubstituted, linear or branched, diols selected from aliphatic diols containing 2 to about 8 carbon atoms, polyalkylene ether glycols containing 2 to 8 carbon atoms, and cycloaliphatic diols containing about 4 to about 12 carbon atoms. The substituted diols, typically, will contain 1 to about 4 substituents independently selected from halo, $C_6$-$C_{10}$ aryl, and $C_1$-$C_4$ alkoxy. Examples of diols which may be used include, but are not limited to, ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol with the preferred diols comprising one or more diols selected from 1,4-butanediol; 1,3-propanediol; ethylene glycol; 1,6-hexanediol; diethylene glycol; and 1,4-cyclohexanedimethanol.

The polyester may also comprise diacid residues which contain about 35 to about 99 mole %, based on the total moles of acid residues, of the residues of one or more substituted or unsubstituted, linear or branched, non-aromatic dicarboxylic acids selected from aliphatic dicarboxylic acids containing 2 to about 12 carbon atoms and cycloaliphatic dicarboxylic acids containing about 5 to about 10 carbon atoms. The substituted non-aromatic dicarboxylic acids will typically contain 1 to about 4 substituents selected from halo, $C_6$-$C_{10}$ aryl, and $C_1$-$C_4$ alkoxy. Non-limiting examples of aliphatic and cycloaliphatic dicarboxylic acids include malonic, succinic, glutaric, adipic, pimelic, azelaic, sebacic, fumaric, 2,2-dimethyl glutaric, suberic, 1,3-cyclopentane-dicarboxylic, 1,4-cyclohexanedicarboxylic, 1,3-cyclohexanedicarboxylic, diglycolic, itaconic, maleic, and 2,5-norbornanedicarboxylic. In addition to the non-aromatic dicarboxylic acids, the polyester may comprise about 1 to about 65 mole %, based on the total moles of acid residues, of the residues of one or more substituted or unsubstituted aromatic dicarboxylic acids containing 6 to about 10 carbon atoms. In the case where substituted aromatic dicarboxylic acids are used, they will typically contain 1 to about 4 substituents selected from halo, $C_6$-$C_{10}$ aryl, and $C_1$-$C_4$ alkoxy. Non-limiting examples of aromatic dicarboxylic acids which may be used in the polyester of our invention are terephthalic acid, isophthalic acid, salts of 5-sulfoisophthalic acid, and 2,6-naphthalenedicarboxylic acid.

In a one embodiment, the polyester comprises diol residues comprising the residues of one or more of 1,4-butanediol; 1,3-propanediol; ethylene glycol; 1,6-hexanediol; diethylene glycol; or 1,4-cyclohexanedimethanol; and diacid residues comprising (i) about 35 to about 95 mole %, based on the total moles of acid residues, of the residues of one or more non-aromatic dicarboxylic acids selected from glutaric acid, diglycolic acid, succinic acid, 1,4-cyclohexanedicarboxylic acid, and adipic acid; (ii) about 5 to about 65 mole %, based on the total moles of acid residues, of the residues of one or more aromatic dicarboxylic acids selected from terephthalic acid and isophthalic acid. More preferably, the non-aromatic dicarboxylic acid will comprise adipic acid, the aromatic dicarboxylic acid will comprise terephthalic acid, and the diol will comprise 1,4-butanediol. In another embodiment, the diacid residues comprise adipic acid residues and 65 mole percent or less of terephthalic acid residues, based on the total moles of diacid residues, and the diol residues comprise 1,4-butanediol residues.

Other polyesters of the present invention are those prepared from the following diols and dicarboxylic acids (or copolyester-forming equivalents thereof such as diesters) in the following mole percent, based on 100 mole percent of a diacid component and 100 mole percent of a diol component:

glutaric acid (about 30 to about 75%); terephthalic acid (about 25 to about 70%); 1,4-butanediol (about 90 to 100%); and modifying diol (0 about 10%);

succinic acid (about 30 to about 95%); terephthalic acid (about 5 to about 70%); 1,4-butanediol (about 90 to 100%); and modifying diol (0 to about 10%); and adipic acid (about 30 to about 75%); terephthalic acid (about 25 to about 70%); 1,4-butanediol (about 90 to 100%); and modifying diol (0 to about 10%).

The modifying diol preferably is selected from 1,4-cyclohexanedimethanol, triethylene glycol, polyethylene glycol, and neopentyl glycol.

Yet other polyesters include linear, branched, or chain-extended copolyesters comprising about 50 to about 60 mole percent adipic acid residues, about 40 to about 50 mole percent terephthalic acid residues, and at least 95 mole percent 1,4-butanediol residues. Even more preferably, the adipic acid residues are from about 55 to about 60 mole percent, the terephthalic acid residues are from about 40 to about 45 mole percent, and the 1,4-butanediol residues are from about 95 to 100 mole percent. Such compositions are commercially available under the trademark ECOFLEX®.

Additional, specific examples of preferred polyesters include (1) a poly(tetra-methylene glutarate-co-terephthalate) containing (a) 50 mole percent glutaric acid residues, 50 mole percent terephthalic acid residues, and 100 mole percent 1,4-butanediol residues; (b) 60 mole percent glutaric acid residues, 40 mole percent terephthalic acid residues, and 100 mole percent 1,4-butanediol residues; or (c) 40 mole percent glutaric acid residues, 60 mole percent terephthalic acid residues, and 100 mole percent 1,4-butanediol residues; (2) a poly(tetramethylene succinate-co-terephthalate) containing (a) 85 mole percent succinic acid residues, 15 mole percent terephthalic acid residues, and 100 mole percent 1,4-butanediol residues or (b) 70 mole percent succinic acid residues, 30 mole percent terephthalic acid residues, and 100 mole percent 1,4-butanediol residues; (3) a poly(ethylene succinate-co-terephthalate) containing 70 mole percent succinic acid residues, 30 mole percent terephthalic acid residues, and 100 mole percent ethylene glycol residues; and (4) a poly(tetramethylene adipate-co-terephthalate) containing (a) 85 mole percent adipic acid residues, 15 mole percent terephthalic acid residues, and 100 mole percent 1,4-butanediol residues or (b) 55 mole percent adipic acid residues, 45 mole percent terephthalic acid residues, and 100 mole percent 1,4-butanediol residues. Further examples include the resins listed in Table A below and include polyhydroxyalkanoates (PHAS) such as, for example, polyhydroxybutyrate (PHB), polyhydroxybutyrate-co-valerate (PHBv), polyhydroxybutyrate-co-octanoate (PHBO), and polyhydroxybutyrate-co-hexanoate (PHBHx); polycaprolactone (PCL), and polylactic acid (PLA).

esterified residue of a polyol having 3 to 6 hydroxyl groups, a polycarboxylic acid having 3 or 4 carboxyl groups (or ester-forming equivalent groups), or a hydroxy acid having a total of 3 to 6 hydroxyl and carboxyl groups.

Representative low molecular weight polyols that may be employed as branching agents include glycerol, trimethylolpropane, trimethylolethane, polyethertriols, glycerol, 1,2,4-butanetriol, pentaerythritol, 1,2,6-hexanetriol, sorbitol, 1,1,4,4,-tetrakis (hydroxymethyl) cyclohexane, tris(2-hydroxyethyl) isocyanurate, and dipentaerythritol. Particular branching agent examples of higher molecular weight polyols (MW 400-3000) are triols derived by condensing alkylene oxides having 2 to 3 carbons, such as ethylene oxide and propylene oxide with polyol initiators.

Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone

TABLE A

| Polymer Name | Trademark or Shorthand Name | Commercial Producers | Chemical Components (mol %) |
|---|---|---|---|
| ECOFLEX Copolyester | ECOFLEX ® | BASF | Terephthalic Acid (41-46%), Adipic Acid (54-59%), Butanediol (~100%), small amount of branching glycol/acid |
| Polycaprolactone polymer | TONE ® 787, PCL | Dow | caprolactone (—O(CH2)5CO—) (~100%) |
| Polybutylenesuccinate | BIONOLLE ®, PAS, PBS | Showa Denko | Succinic Acid (~100%), Butanediol (~100%), small amount of branching glycol/acid |
| Polyhydroxybutyrate | BIOPOL ®, PHB | Metabolix | 4-hydroxylbutyric acid (~100%) |
| Polyhydroxybutyrate-co-valerate | BIOPOL ®, PHBv | Metabolix | 4-hydroxylbutyric acid & 3-hydroxyproprionic acid, predominately 4HBA |
| AAPE Copolyester & Starch Blend | BIOPLAST ® | Biotec | 40 wt % thermoplastic starch compounded w/AAPE |
| Polylactic Acid | NATUREWORKS ™ PLA | Cargill Dow LLC | Lactic Acid |

Although polyesters comprising polymers prepared from hydroxycarboxylic acids and their various derivatives (such as cyclic esters) have been described above as being made synthetically via ring opening polymerization, a number of these biodegradable polyesters can also be derived from biological processes. Specific examples of biodegradable polyesters that have been derived from biological processes described in the patent and technical literature include PHB, PHBv, PHAs, and PLA. These polyesters have been prepared via biological processes including fermentation, harvesting from plants, and genetically modified plants and bacteria.

The biodegradable polyester preferably comprises from about 10 to about 1,000 repeating units and more preferably, from about 15 to about 600 repeating units. The biodegradable polyester preferably also has an inherent viscosity of about 0.4 to about 2.0 dL/g, more preferably about 0.7 to about 1.4, as measured at a temperature of 25° C. using a concentration of 0.5 gram polyester in 100 ml of a 60/40 by weight solution of phenol/tetrachloroethane.

The polyester, optionally, may contain the residues of a branching agent. The weight percentage ranges for the branching agent are from about 0 to about 2 wt %, preferably about 0.1 to about 1 wt %, and most preferably about 0.1 to about 0.5 wt % based on the total weight of the polyester. The branching agent preferably has a weight average molecular weight of about 50 to about 5000, more preferably about 92 to about 3000, and a functionality of about 3 to about 6. For example, the branching agent may be the tetracarboxylic acid, 1,1,2,2-ethanetetra-carboxylic acid, 1,1,2-ethanetricarboxylic acid, 1,3,5-pentanetricarboxylic acid, and 1,2,3,4-cyclopentanetetracarboxylic acid. Although the acids may be used as such, preferably, they are used in the form of their lower alkyl esters or their cyclic anhydrides in those instances where cyclic anhydrides can be formed.

Representative hydroxy acids as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane, and 1,2,4-butanetriol.

One example of a branched, biodegradable polyester of the present invention is poly(tetramethylene adipate-co-terephthalate) containing 100 mole percent 1,4-butanediol residues, 43 mole percent terephthalic acid residues, and 57 mole percent adipic acid residues and branched with about 0.5 weight percent pentaerythritol. This biodegradable polyester may be produced by the transesterification and polycondensation of dimethyl adipate, dimethyl terephthalate, pentaerythritol, and 1,4-butanediol. The polyester may be prepared by heating the monomers at 190° C. for 1 hour, 200° C. for 2 hours, 210° C. for 1 hour, then at 250° C. for 1.5 hours under vacuum in the presence of 100 ppm of Ti present initially as titanium tetraisopropoxide.

Another example of a branched, biodegradable polyester is poly(tetra-methylene adipate-co-terephthalate) containing 100 mole percent 1,4-butanediol residues, 45 mole percent terephthalic acid residues, and 55 mole percent adipic acid residues and branched with 0.3 weight percent pyromellitic dianhydride. This polyester is produced via reactive extrusion of linear poly (tetramethylene adipate-co-terephthalate) with pyromellitic dianhydride using an extruder.

The polyesters of the invention may also comprise one or more ion-containing monomers to increase their melt viscosity. It is preferred that the ion-containing monomer is selected from salts of sulfoisophthalic acid or a derivative thereof. A typical example of this type of monomer is sodiosulfoisophthalic acid or the dimethyl ester of sodiosulfoisophthalic. The preferred concentration range for ion-containing monomers is about 0.3 to about 5.0 mole %, and, more preferably, about 0.3 to about 2.0 mole %, based on the total moles of acid residues.

The polyesters of the instant invention may also comprise from 0 to about 5 wt %, based on the total weight of the composition, of one or more chain extenders. Exemplary chain extenders are divinyl ethers such as those disclosed in U.S. Pat. No. 5,817,721 or diisocyanates such as, for example, those disclosed in U.S. Pat. No. 6,303,677. Representative divinyl ethers are 1,4-butanediol divinyl ether, 1,5-hexanediol divinyl ether, and 1,4-cyclohexandimethanol divinyl ether. Representative diisocyanates are toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate, isophorone diisocyanate, and methylenebis(2-isocyanatocyclohexane). The preferred diisocyanate is hexamethylene diisocyanate. The weight percent ranges are preferably about 0.3 to about 3.5 wt %, based on the total weight percent of the polyester, and more preferably, about 0.5 to about 2.5 wt %. It is also possible in principle to employ trifunctional isocyanate compounds which may contain isocyanurate and/or biurea groups with a functionality of not less than three, or to replace the diisocyanate compounds partially by tri- or polyisocyanates.

The polyesters of the instant invention can be readily prepared from the appropriate dicarboxylic acids, esters, anhydrides, or salts, the appropriate diol or diol mixtures, and any branching agents using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors.

The polyesters may be prepared by procedures known to persons skilled in the art and described, for example, in U.S. Pat. No. 2,012,267. Such reactions are usually carried out at temperatures from 150° C. to 300° C. in the presence of polycondensation catalysts such as, for example, alkoxy titanium compounds, alkali metal hydroxides and alcoholates, salts of organic carboxylic acids, alkyl tin compounds, metal oxides, and the like. The catalysts are typically employed in amounts between 10 to 1000 ppm, based on total weight of the reactants.

The film of the invention may be calendered without using plasticizers or antiblocking additives such as hard solids, minerals, diatomaceous earth, talc, and calcium carbonate. Thus, in one embodiment, the film of the invention is free of anti-blocking additives. The method involves using a release agent in combination with careful control of the temperature of the polymer melt as it passes through the calendering rolls.

Although not essential to the invention, our novel films, additionally, may contain dyes, pigments, fillers, and processing aids such as, for example, fillers, matting agents, antiblocking agents, antistatic agents, blowing agents, fibers, carbon fibers, glass, impact modifiers, carbon black, starch, talc, $TiO_2$ and the like as desired to modify the properties of the film such as, for example, its appearance, biodegradability, or lower its cost. For example, the film of the invention may comprise 0 to about 30 wt % of one or more processing aids, in addition to the release additive, to alter the surface properties of the film or to enhance flow of the semicrystalline melt during calendering. Representative examples of processing aids include calcium carbonate, talc, clay, mica, wollastonite, kaolin, diatomaceous earth, $TiO_2$, $NH_4Cl$, silica, calcium oxide, sodium sulfate, and calcium phosphate. Further examples of processing aid levels within the polyester composition of the instant invention are about 5 to about 25 wt % and about 10 to about 20 wt %. Colorants, sometimes referred to as toners, may be added to impart a desired neutral hue and/or brightness to the polyester and the calendered product. In another example, the film of invention may further comprise starch or talc. The starch may be a thermoplastic starch. A thermoplastic starch is a starch that has been gelatinized by extrusion cooking to impart a disorganized crystalline structure. As used herein, thermoplastic starch is intended to include "destructured starch" as well as "gelatinized starch", as described, for example, in Bastioli, C. *Degradable Polymers*, 1995, Chapman & Hall: London, pages 112-137. By gelatinized, it is meant that the starch granules are sufficiently swollen and disrupted that they form a smooth viscous dispersion in the water. Gelatinization is effected by any known procedure such as heating in the presence of water or an aqueous solution at temperatures of about 60° C. The presence of strong alkali is known to facilitate this process. The thermoplastic starch may be prepared from any unmodified starch from cereal grains or root crops such as corn, wheat, rice, potato, and tapioca, from the amylose and amylopectin components of starch, from modified starch products such as partially depolymerized starches and derivatized starches, and also from starch graft copolymers. Thermoplastic starches are commercially available from National Starch Company.

The biodegradable polyesters that may be used in the film of the invention may contain biodegradable additives to enhance their disintegration and biodegradability in the environment. One effect of such additives is to increase the biodegradability of the polyester composition and to compensate for reduced biodegradability resulting from high concentrations of other, nonbiodegradable additives. Representative examples of the biodegradable additives which may be included in the film of this invention include microcrystalline cellulose, polyvinyl alcohol, thermoplastic starch or other carbohydrates, or combination thereof. For example, the film may further comprise about 1 to about 40 wt %, based on the total weight of the composition, of one or more biodegradable additives selected from thermoplastic starch, microcrystalline cellulose, and polyvinyl alcohol. In another example, the polyester composition may comprise about 1 to about 30 wt % of a biodegradable additive. Other examples of biodegradable additive levels are about 5 to about 25 wt % and about 10 to about 20 wt %. A preferred biodegradable additive is thermoplastic starch.

The film may further comprise biodegradation accelerants, that is, an additive that increases or accelerates the rate of biodegradation in the environment. We have discovered that certain additives, for example added as a processing aid, may serve a dual purpose as a biodegradation accelerant. It is believed that accelerants such as, for example, calcium carbonate, calcium hydroxide, calcium oxide, barium oxide, barium hydroxide, sodium silicate, calcium phosphate, magnesium oxide, and the like may function to alter the pH of the composting environment and, thus, accelerate the biodegradation process.

In addition to the polyester, the film of the instant invention comprises a release additive that is effective to prevent sticking of the polyester composition to the calendering rolls. As used herein, the term "effective" means that the polyester composition passes freely between the calendering rolls without wrapping itself around the rolls or producing an excessive layer of polyester on the surface of the rolls. The amount of additive used in the polyester composition is typically about 0.1 to about 2 wt %, based on the total weight percent of the film. The optimum amount of additive used is determined by factors well known in the art and is dependent upon variations in equipment, material, process conditions, and film thickness. Additional examples of additive levels are about 0.1 to about 1 wt %, about 0.1 to about 0.8 wt %, and about 0.1 to about 0.5 wt %. Examples of additives of the present invention include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and poly(propylene) waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). Typically, the additive comprises at least one compound selected from erucylamide, stearamide, calcium stearate, zinc stearate, stearic acid, montanic acid, montanic acid esters, montanic acid salts, oleic acid, palmitic acid, paraffin wax, polyethylene waxes, poly(propylene) waxes, carnauba wax, glycerol monostearate, and glycerol distearate.

Another additive which may be used comprises a fatty acid or a salt of a fatty acid containing more than 18 carbon atoms and an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In another example, the ratio of the fatty acid or salt of the fatty acid to the ester wax is 2:1 or greater.

The fatty acid may comprise montanic acid and the salt of the fatty acid may comprise the sodium salt of montanic acid, the calcium salt of montanic acid, the lithium salt of montanic acid, or a combination thereof. The fatty acid residue of the ester wax may comprise montanic acid. The alcohol residue of the ester wax preferably contains 2 to 28 carbon atoms. Examples of alcohols include montanyl alcohol, ethylene glycol, butylene glycol, glycerol, and pentaerythritol. The additive may also comprise an ester wax which has been partially saponified with a base such as, for example, calcium hydroxide.

Conventional calendering equipment and processes may be used to calender the polyesters. For example, in a typical calendering process line, the plastic resin is blended with various additives such as stabilizers to prevent thermal degradation; modifiers for clarity, heat stability, or opacity characteristics; pigments; lubricants and processing aids; anti-static agents; UV inhibitors; and flame retardants. The mixed ingredients are plasticized in a kneader or extruder. Through heat, shear, and pressure, the dry powders, pellets, or liquids are fused to form a largely homogeneous, molten material or partially molten material. The extruder feeds the molten material in a continuous process to the top of the calendering section of the calendering line in between first and second heated calender rolls. Typically, four rolls are used to form three nips or gaps. The rolls may be configured in various arrangements, such as an "L" shape or an inverted "L" shape. The rolls vary in size to accommodate different film widths. The rolls have separate temperature and speed controls. The material proceeds through the nip between the first two rolls, referred to as the feed nip. The rolls rotate in opposite directions to help spread the material across the width of the rolls. The material winds between the first and second, second and third, third and fourth rolls, etc. The gap between rolls decreases in thickness between each of the rolls so that the material is thinned between the sets of rolls as it proceeds. After passing through the calender section, the material moves through another series of rolls where it can be stretched and gradually cooled, forming a film or sheet. The cooled material is then wound into master rolls. General descriptions of calendering processes are disclosed in Jim Butschli, *Packaging World*, p. 26-28, June 1997 and W. V. Titow, *PVC Technology*, $4^{th}$ Edition, pp 803-848 (1984), Elsevier Publishing Co. For oriented films, it is possible to use commercial calendering equipment that includes in-line film orientation equipment such as biax or monoaxial orientation equipment (e.g., tentering frame or differential speed roll devices).

The temperature of the polymer melt as it passes through the calendering rolls is sometimes referred to as the polymer melt probe temperature or the polymer melt temperature and is typically measured by a temperature probe. This temperature should be carefully controlled in order to achieve calendering. The melt temperature is normally controlled by controlling a combination of the frictional heat and the direct heat transfer to the polymer. Frictional heat is a function of the polymer melt viscosity and the calendering roll spin rate (usually measured in revolutions per minute or RPM). Direct heat transfer to the polymer is normally accomplished by using heated calendering rolls or by preheating the polymer fed to the rolls. Typically, once the polyester melt reaches a calenderable temperature wherein the polyester is in a semicrystalline melt (i.e., below the upper temperature of its melting range), the polymer melt should be maintained at that temperature, + or −15° C., preferably + or −10° C., or more preferably + or −5° C. Typically, for the semicrystalline polyesters of the present invention, the polymer melt probe temperature ranges from about 80° C. to about 160° C., and the calender roll temperature ranges from about 80° C. to about 130° C. The combination of controlling the polymer melt temperature and adding the above-mentioned release agents enables the heretofore unachievable calendering of semicrystalline and biodegradable polyesters.

It is advantageous to customize the polymer melt temperature for each polymer. Without wishing to be bound by theory, calendering occurs smoothly when the polymer melt temperature reaches a point or range where there is a balance between melted and unmelted (crystallites) polyesters in the melt. In the context of the present invention, this state where there is a mixture of melted polyester and unmelted crystallites present is defined as a semicrystalline melt. For the polyesters of the invention, this temperature is above the Tg and below the upper temperature of the melting range of each polyester of the film. For example, in one embodiment, the maximum temperature of the calendering process is within the melting point range of each of the polyesters. In another embodiment, the film of the invention may be formed from a blend of polyesters such as, for example, a blend of an AAPE and poly(lactic acid) calendered at a maximum temperature that below the upper temperature of the melting range for each of the AAPE and PLA. In another example, the film may comprise an AAPE such as, for example, ECOFLEX®, and may be calendered at a temperature that is within the melting range of the AAPE. In a further example, the film comprises a poly(hydroxybutyrate) and is calendered at a temperature within the melting point range of the poly(hydroxybutyrate. This balance of melted and unmelted crystallites can achieve useful ranges of melt strength and crystallization rates by maintaining a small fraction of the polyester in the solid (unmelted) form. This fraction potentially provides thermally reversible crosslinks, which enhance (increase) the normally low melt strengths of some polyesters such as, for example, some biodegradable polyesters. Further, this fraction potentially increases the rate of crystallization (by providing pre-formed nucleation sites), which potentially reduces out-feed roll sticking problems and provides the thermally perfected (annealed) crystalline regions seen in the final films. The crystalline regions enhance the thermal resistance of the final films.

The calendered films of the invention show a higher degree of clarity in comparison to melt-cast films with substantially the same composition. The phrase "substantially the same composition", as used herein, means that the calendered film and melt-cast film are comprised of at least 90 wt % of the identical polyester composition and differ only in the release additive, antiblock additives, or lubricants that may be used to process the film. For example, melt-cast films typically require the presence of an antiblocking additive, which increases the percent haze of the film. Thus, in one embodiment, the film of the present invention has a lower percentage of haze than a melt-cast film having substantially the same composition. The measurement of percent haze can be determined by procedures well-known to persons skilled in the art such as, for example, by ASTM Method D-1003.

The calendered films also exhibit improved thermal properties and strength over melt-cast films having substantially the same composition. For example, the calendered films of the invention have a higher thermal resistance than a melt cast film of substantially the same composition. By "higher thermal resistance, it is meant that the calendered film has a higher peak melting temperature than a melt cast film having substantially the same composition. The term "higher peak melting temperature", as used herein, means that the calendered film exhibits a second melting point peak within its melting point range at a temperature that is greater than the peak melting point temperature of a melt cast film having substantially the same composition. The presence of a second, higher peak melting point in the calendered films of the invention is indicative of the presence of a second, higher melting crystalline phase within the film that enhances its thermal resistance.

The film of the instant invention may be further oriented or stretched either during or subsequent to the calendering process to produce an oriented film. The present invention, therefore, provides an oriented film comprising one or more semicrystalline polyesters and a release additive wherein the film is formed by a calendering process at a maximum temperature below the upper temperature of the melting point range of each of the polyesters. The oriented films of the invention encompass the embodiments for the calendered films discussed hereinabove such as, for example, the polyesters; including the diacids, diols, inherent viscosities, branching monomers, chain extenders, etc.; release additives, fillers, biodegradable additives and accelerants, and processing aids. For example, in one embodiment, the oriented film consists essentially of a polyester and release additive. In another example, the polyesters are substantially free of plasticizer. In yet another example, the polyesters of the oriented film are biodegradable. In yet another example, the polyester of the oriented film may be a linear or branched aliphatic-aromatic, random copolyester (abbreviated herein as, "AAPE"). Further examples of biodegradable polyesters include, but are not limited to, ECOFLEX® copolyester, polycaprolactone, polylactic acid, polybutylenesuccinate, polyhydroxybutyrate, polyhydroxybutyrate-valerate, or copolymers thereof. In an example wherein the polyester is an AAPE, the non-aromatic dicarboxylic acid will preferably comprise adipic acid, the aromatic dicarboxylic acid will comprise terephthalic acid, and the diol will comprise 1,4-butanediol. In another embodiment, the diacid residues comprise adipic acid residues and 65 mole percent or less of terephthalic acid residues, based on the total moles of diacid residues, and the diol residues comprise 1,4-butanediol residues. Yet other preferred polyesters include linear, branched, or chain-extended copolyesters comprising about 50 to about 60 mole percent adipic acid residues, about 40 to about 50 mole percent terephthalic acid residues, and at least 95 mole percent 1,4-butanediol residues. Even more preferably, the adipic acid residues are from about 55 to about 60 mole percent, the terephthalic acid residues are from about 40 to about 45 mole percent, and the 1,4-butanediol residues are from about 95 to 100 mole percent. The oriented film may further comprise fillers such as, for example, starch or talc. Preferably, the starch may be a thermoplastic starch. In a further embodiment, the oriented film also is free of anti-blocking additives. As described previously, the polyester may have a crystallization half-time from a molten state of less than 5 minutes; or in another example, less than 3 minutes.

Conventional orientation equipment and processes may also be used to stretch the calendered film. The calendered film may be oriented monoaxially or biaxially up to 600% in each direction. The calendered film may be oriented in an integrated in-line process with the calendering process, or it may be oriented in a subsequent off-line process. It has been surprisingly discovered that when these calendered films are oriented, the resulting films can exhibit physical strength and improvements in clarity that are unexpectedly high compared to films that are made by melt-casting or melt-blowing, with the exception of a thermoplastic starch blend. For example, orientation typically improves the strength of the film and gives a second melting point peak that is higher than the peak melting point of a melt cast film.

As with the calendered films, the oriented calendered, films of our invention also can exhibit improved thermal properties, clarity, and strength over melt-cast films having substantially the same composition. Further, in some cases the oriented, calendered films may have a higher thermal resistance than the corresponding nonoriented, calendered films Thus, in one embodiment of our invention, the oriented, calendered film of the invention has a higher melting peak temperature than an oriented, melt-cast film having substantially the same composition. The oriented, calendered films of the invention develop a high degree of clarity upon orientation and typically have a lower percentage of haze than an oriented, melt-cast film having substantially the same composition. For example, the oriented film will typically have a percentage of haze of less than 5%. In another example, the oriented film may have less than 3% haze. The invention is further described and illustrated by the following examples.

EXAMPLES

General—Films were prepared using biodegradable aliphatic-aromatic polyester (AAPE) compositions containing a mixture of adipic acid and terephthalic acid as the diacid components and 100 mole % 1,4-butanediol as the diol component and blends thereof with other biodegradable polymers such as PLA and thermoplastic starch. Table 1 shows the polymer film identification number, resin material used, mole percentage of terephthalic acid in the resin, visual film grade, film forming process, film thickness, and the melting point range. Melting point ranges are as defined herein and were estimated from the DSC curves obtained at a heating rate of 20° C./min.

TABLE 1

| Polymer Film ID No. | Resin Material | Mole % of Terephthalic Acid | Melting Point Range (° C.) | Cryst. ½ Time (min) | Film Forming Process | Film Thickness ($10^{-3}$ in) |
|---|---|---|---|---|---|---|
| 1 | AAPE | 43.5 | 70-130 | 0.6 | Calendered | 17 |
| 2 | AAPE | 43.5 | 70-130 | 0.6 | Calendered | 5.3 |
| 3 | AAPE | 43.5 | 70-130 | 0.6 | Calendered | 8.1 |
| 4 | Blend of AAPE with Polylactic Acid (3:1 wt ratio) | 45.5 | 70-135 (AAPE) 125-170 (PLA) | 26.3 (PLA) | Calendered | 5.8 |
| 5 | Blend of AAPE and Thermoplastic Starch (40 wt % starch) | 45.5 | 70-135 (AAPE) | | Calendered | 10.4 |
| 6 | AAPE | 60 | 72-175 | | Calendered | 8.6 |
| 7 | Blend of AAPE with 10 wt % Talc Antiblock | 45.5 | 70-135 (AAPE) | | Melt Cast | 10.25 |
| 8 | Blend of AAPE with 10 wt % Talc Antiblock | 45.5 | 70-135 (AAPE) | | Melt Cast | 2 |
| 9 | AAPE | 45.5 | 70-135 | | Calendered | 9.2 |
| 10 | ECOFLEX ® Copolyester | approx. 45 | 60-135 | 0.7 | Calendered | 7.6 |
| 11 | ECOFLEX ® Copolyester | approx. 45 | 60-135 | 0.7 | Calendered | 6.7 |

Calendering Procedure—Film ID Nos. 1-6 and 9-11 were prepared on a Dr. Collin instrumented two-roll mill to simulate calendering. The resin pellets containing 0.9 wt % of a wax release agent (a 1:1 blend, by weight, of LICO-WAX® S montanic acid (available from Clariant Corporation) and LICOWAX® OP (a butylene glycol ester of montanic acid that has been partially saponified with calcium hydroxide, available from Clariant Corporation)) were added directly to the heated rolls and processed into a melt, or were added via a precompounded masterbatch containing the release agent in a copolyester resin base. Table 2 shows the roll gap, the roll temperature, polymer melt probe temperature (listed in Table 2 under "Melt Temp"), revolutions-per-minute takeoff, and comments about the processing for each film.

TABLE 2

| Polymer Film ID No. | Roll Gap (mm) | Roll Temp (° C.) | Melt Temp (° C.) | RPM Takeoff |
|---|---|---|---|---|
| 1 | 0.25 | 95 | 105 | 10 |
| 2 | 0.2 | 98-100 | 105 | 10 |
| 3 | 0.2 | 98-100 | 105 | 10 |
| 4 | 0.15 | 105 | 110 | 10 |
| 5 | 0.25 | 115-110 | 130-115 | 10 |
| 6 | 0.2 | 145 | ~150 | |
| 7 | | not calendered, melt cast | | |
| 8 | | not calendered, melt cast | | |
| 9 | 0.3 | 105 | ~108 | 5 to 10 |
| 10 | 0.3 | 108-110 | 124 | |
| 11 | 0.3 | 108-110 | 124 | |

Melt-Casting Procedure—Film ID Nos. 7 and 8 were prepared using the following melt-casting procedure. A concentrate was formed by compounding 50 wt % uncoated talc (mean size=6 micron) with 50 wt % AAPE in a Werner-Pflederer twin screw extruder; 20% of this concentrate was added to additional AAPE to form a mixture containing 10% talc. The resin mixture was then dried in a dehumidifying dryer overnight at the following conditions:

| | |
|---|---|
| Drying Time | 4-6 hours |
| Temperature | 65° C. (150° F.) |
| Dew Point | −30° C. (−20° F.) |
| Airflow rate | 1 CFM/lb/hr |
| Pellet Moisture Content | 100 ppm (0.01%) by weight |

The dried resin mixture was then melt-cast into a film using the following temperature profile and single screw extrusion:

| | |
|---|---|
| Screw | 50 mm (2 inch) Barrier Screw with twisted Maddock head mixing section. (Square pitched screws also used successfully) 24:1 L/D (30:1 also used successfully) 3 to 1 Compression Ratio |
| Zone 1 | 199° C. (390° F.) |
| Zone 2 | 216° C. (420° F.) |
| Zone 3 | 216° C. (420° F.) |
| Zone 4 | 216° C. (420° F.) |
| Adapter | 204° C. (400° F.) |
| Die | 160° C. (320° F.) |
| Die Type | 760 mm (30 inch) flexible lip coat hanger die. |
| Screen Pack | 100 mesh |
| Casting Roll Temp. | 27° C. (80° F.) |

Orientation Procedure—Film ID Nos. 1, 3-7, and 10-11 were oriented using a TM Long film orientation device with a 4× MD orientation (@ 40° C.) while physically holding the TD direction constant (1×). Orientation was conducted at an extension rate of 14 inches/sec, except where noted in Table 3, using 0.5 inch wide and about 6 inches long strips cut from the calendered/melt-cast films. Table 3 shows the polymer film identification number of the oriented film, the starting film number, orientation conditions, film thickness, and film forming process used. Tables 4A-4E show the physical and thermal properties of the films obtained (o=oriented; u=unoriented in the tables which follow).

TABLE 3

| Polymer Film ID No. | Starting Film ID No. | Orientation Comments | Finished Thickness ($10^{-3}$ in) | Film Forming Process |
|---|---|---|---|---|
| 1A | 1 | 7 in/sec on 0.5 in strip | 5.3 | Calendered & Oriented |
| 3A | 3 | 14 in/sec on 0.5 in strip | 2.4 | Calendered & Oriented |
| 4A | 4 | 14 in/sec on 0.5 in strip | 2.2 | Calendered & Oriented |
| 5A | 5 | 14 in/sec on 0.5 in strip | 2.9 | Calendered & Oriented |
| 6A | 6 | 14 in/sec on 0.5 in strip | 1.9 | Calendered & Oriented |
| 7A | 7 | 14 in/sec on 0.5 in strip | 3.2 | Melt Cast & Oriented |
| 10A | 10 | 14 in/sec on 0.5 in strip | 2.4 | Calendered & Oriented |
| 11A | 11 | 14 in/sec on 0.5 in strip | 2.6 | Calendered & Oriented |

TABLE 4A

| Polymer Film ID No. | Property Measured in MD/TD | Young's Modulus (psi) | Young's Modulus Ratio o/u | Yield Strain (%) | Yield Strength Ratio o/u | Yield Stress (psi) | Yield Stress Ratio o/u |
|---|---|---|---|---|---|---|---|
| 1 | MD | 5605 | | 35.3 | | 895 | |
|  | TD | 6483 | | 32.0 | | 897 | |
| 1A | MD | 10025 | 1.8 | 59.2 | 1.7 | 4348 | 4.9 |
|  | TD | 5814 | 0.9 | 21.7 | 0.7 | 546 | 0.6 |
| 2 | MD | 5581 | | 25.8 | | 636 | |
|  | TD | 5770 | | 40.5 | | 636 | |
| 3 | MD | 7376 | | 26.0 | | 917 | |
|  | TD | 6091 | | 50.5 | | 603 | |
| 3A | MD | 10987 | 1.5 | 52.7 | 2.0 | 4411 | 4.8 |
|  | TD | 9589 | 1.6 | 17.8 | 0.4 | 796 | 1.3 |
| 4 | MD | 8330 | | 24.0 | | 955 | |
|  | TD | 9073 | | 21.0 | | 968 | |
| 4A | MD | 11405 | 1.4 | 48.5 | 2.0 | 4812 | 5.0 |
|  | TD | 8955 | 1.0 | 20.3 | 1.0 | 803 | 0.8 |
| 5 | MD | 22412 | | 20.8 | | 1414 | |
|  | TD | 20223 | | 16.8 | | 1076 | |
| 5A | MD | 18409 | 0.8 | 63.3 | 3.0 | 5009 | 3.5 |
|  | TD | 15147 | 0.7 | 16.7 | 1.0 | 1047 | 1.0 |
| 6 | MD | 26568 | | 18.9 | | 1911 | |
|  | TD | 27433 | | 20.9 | | 1973 | |
| 6A | MD | 11751 | 0.4 | 34.1 | 1.8 | 2889 | 1.5 |
|  | TD | 3513 | 0.1 | 27.9 | 1.3 | 635 | 0.3 |
| 7 | MD | 19377 | | 18.5 | | 1183 | |
|  | TD | 17611 | | 16.0 | | 1151 | |
| 7A | MD | 12039 | 0.6 | 44.2 | 2.4 | 4221 | 3.6 |
|  | TD | 9636 | 0.5 | 22.6 | 1.4 | 841 | 0.7 |
| 8 | MD | 10742 | | 28.0 | | 1110 | |
|  | TD | 9275 | | 18.0 | | 921 | |
| 10 | MD | 9095 | | 21.9 | | 948 | |
|  | TD | 10742 | | 28.0 | | 1110 | |
| 10A | MD | 9847 | 1.1 | 69.2 | 3.2 | 4871 | 5.1 |
|  | TD | 8727 | 0.8 | 16.7 | 0.6 | 753 | 0.7 |
| 11 | MD | 9116 | | 21.9 | | 958 | |
|  | TD | 9257 | | 16.8 | | 745 | |
| 11A | MD | 9912 | 1.1 | 46.6 | 2.1 | 4158 | 4.3 |
|  | TD | 7589 | 0.8 | 16.9 | 1.0 | 656 | 0.9 |

TABLE 4B

| Polymer Film ID No. | Property Measured in MD/TD | Break Strength (%) | Break Strength Ratio o/u | Break Stress (psi) | Break Stress Ratio o/u | Energy/Vol @ Break (lb/in$^2$) | Energy/Vol @ Break Ratio o/u |
|---|---|---|---|---|---|---|---|
| 1 | MD | 952 | | 2190 | | 1258 | |
|  | TD | 908 | | 2113 | | 1122 | |
| 1A | MD | 259 | 0.3 | 6586 | 3.0 | 1058 | 0.8 |
|  | TD | 817 | 0.9 | 1311 | 0.6 | 598 | 0.5 |
| 2 | MD | 429 | | 1191 | | 324 | |
|  | TD | 667 | | 1453 | | 555 | |
| 3 | MD | 549 | | 2015 | | 731 | |
|  | TD | 464 | | 1103 | | 326 | |
| 3A | MD | 272 | 0.5 | 8746 | 4.3 | 1282 | 1.8 |
|  | TD | 770 | 1.7 | 1895 | 1.7 | 768 | 2.4 |
| 4 | MD | 922 | | 2994 | | 1397 | |
|  | TD | 819 | | 2448 | | 1082 | |
| 4A | MD | 268 | 0.3 | 9974 | 3.3 | 1451 | 1.0 |
|  | TD | 701 | 0.9 | 1737 | 0.7 | 677 | 0.6 |
| 5 | MD | 462 | | 1915 | | 627 | |
|  | TD | 517 | | 1414 | | 500 | |

TABLE 4B-continued

| Polymer Film ID No. | Property Measured in MD/TD | Break Strength (%) | Break Strength Ratio o/u | Break Stress (psi) | Break Stress Ratio o/u | Energy/Vol @ Break (lb/in$^2$) | Energy/Vol @ Break Ratio o/u |
|---|---|---|---|---|---|---|---|
| 5A | MD | 151 | 0.3 | 6655 | 3.5 | 635 | 1.0 |
|    | TD | 439 | 0.8 | 1503 | 1.1 | 459 | 0.9 |
| 6  | MD | 389 |     | 2295 |     | 657 |     |
|    | TD | 139 |     | 1947 |     | 221 |     |
| 6A | MD | 153 | 0.4 | 6525 | 2.8 | 554 | 0.8 |
|    | TD | 795 | 5.7 | 2405 | 1.2 | 902 | 4.1 |
| 7  | MD | 986 |     | 3533 |     | 1605 |    |
|    | TD | 884 |     | 2986 |     | 1287 |    |
| 7A | MD | 215 | 0.2 | 9537 | 2.7 | 1088 | 0.7 |
|    | TD | 746 | 0.8 | 2155 | 0.7 | 832  | 0.6 |
| 8  | MD | 773 |     | 2988 |     | 1164 |    |
|    | TD | 891 |     | 3112 |     | 1255 |    |
| 10 | MD | 884 |     | 3847 |     | 1429 |    |
|    | TD | 773 |     | 2988 |     | 1164 |    |
| 10A| MD | 229 | 0.3 | 11809 | 3.1 | 1242 | 0.9 |
|    | TD | 894 | 1.2 | 3010 | 1.0 | 1070 | 0.9 |
| 11 | MD | 922 |     | 4059 |     | 1518 |    |
|    | TD | 817 |     | 2393 |     | 902  |    |
| 11A| MD | 217 | 0.2 | 10441 | 2.6 | 1072 | 0.7 |
|    | TD | 807 | 1.0 | 2311 | 1.0 | 774  | 0.9 |

TABLE 4C

| Polymer Film ID No. | Property Measured in MD/TD | Thickness (in) | Thickness Ratio o/u | 60° Gloss | % Haze | Tg (° C.) |
|---|---|---|---|---|---|---|
| 1  | MD | 0.01797 |      | 67.4 | 16.4 | −37.5 |
|    | TD | 0.01604 |      |      |      |       |
| 1A | MD | 0.00570 | 0.32 | 69.3 | 9.2  | −36.2 |
|    | TD | 0.00483 | 0.30 |      |      |       |
| 2  | MD | 0.01208 |      | 20   | 47   | −35.5 |
|    | TD | 0.01220 |      |      |      |       |
| 3  | MD | 0.00714 |      | 14.2 | 29.2 | −35.4 |
|    | TD | 0.00909 |      |      |      |       |
| 3A | MD | 0.00234 | 0.33 | 72.2 | 2.8  | −34.5 |
|    | TD | 0.00240 | 0.26 |      |      |       |
| 4  | MD | 0.00569 |      | 57.1 | 8.8  | −36.9 |
|    | TD | 0.00591 |      |      |      |       |
| 4A | MD | 0.00211 | 0.37 | 70.3 | 2.9  | −33.8 |
|    | TD | 0.00219 | 0.37 |      |      |       |
| 5  | MD | 0.01011 |      | 18.8 | 41.9 | −33.3 |
|    | TD | 0.01072 |      |      |      |       |
| 5A | MD | 0.00296 | 0.29 | 10.4 | 63.3 | −33.4 |
|    | TD | 0.00280 | 0.26 |      |      |       |
| 6  | MD | 0.00896 |      | 65.6 | 19   | −23 |
|    | TD | 0.00832 |      |      |      |     |
| 6A | MD | 0.00195 | 0.22 | 28.6 | 5.3  | Not Meas. |
|    | TD | 0.00191 | 0.23 |      |      |     |
| 7  | MD | 0.01042 |      | 27.6 | 83.5 | −33.1 |
|    | TD | 0.01007 |      |      |      |     |
| 7A | MD | 0.00323 | 0.31 | 17.2 | 77.5 | −32.9 |
|    | TD | 0.00317 | 0.31 |      |      |     |
| 8  | MD | 0.00857 |      | 63   | 18.1 | −32.6 |
|    | TD | 0.00978 |      |      |      |     |
| 10 | MD | 0.00660 |      | 24.2 | 27.9 | −32.15 |
|    | TD | 0.00857 |      |      |      |     |
| 10A| MD | 0.00247 | 0.37 | 35.4 | 5.2  | −29.5 |
|    | TD | 0.00235 | 0.27 |      |      |     |
| 11 | MD | 0.00626 |      | 37.1 | 27.5 | −33.5 |
|    | TD | 0.00708 |      |      |      |     |
| 11A| MD | 0.00236 | 0.38 | 53.7 | 5    | −30.5 |
|    | TD | 0.00277 | 0.39 |      |      |     |

TABLE 4D

| Polymer Film ID No. | DSC Heat Cycle | Tc (° C.) | Heat of Fusion Tc | Tm1 (° C.) | Heat of Fusion Tm1 | Tm2 (° C.) | Heat of Fusion Tm2 |
|---|---|---|---|---|---|---|---|
| 1  | 1 | 51.2 | 1.2 | 96.8  | 4.8 | 120   | 0.93 |
|    | 2 | 66.1 |     | 112.6 |     |       |      |
| 1A | 1 | 51.6 | 1.3 | 96.4  | 6.6 | 120.8 | 1.5  |
|    | 2 | 62.9 |     | 110.8 |     |       |      |
| 2  | 1 | 47.6 | 1.3 | 103.1 | 5.1 | 123.9 | 0.94 |
|    | 2 | 61.8 |     | 117   |     |       |      |
| 3  | 1 | 49.8 | 1.2 | 100.6 | 6   | 123.1 | 0.9  |
|    | 2 | 63.4 |     | 112.7 |     |       |      |
| 3A | 1 | 50.9 | 1.8 | 109.9 | 6.9 | 123   |      |
|    | 2 | 60.3 |     | 114.5 |     |       |      |
| 4  | 1 | 49   | 1.4 | 103   | 5.2 | 123.1 | 1.2  |
|    | 2 | 63.3 | 1.9 | 110.8 | 4.7 |       |      |
| 4A | 1 | 55   | 1.6 | 104.8 | 5.8 | 122.7 | 1.3  |
|    | 2 | 64.5 | 2.2 | 113.7 | 4.9 |       |      |

TABLE 4D-continued

| Polymer Film ID No. | DSC Heat Cycle | Tc (° C.) | Heat of Fusion Tc | Tm1 (° C.) | Heat of Fusion Tm1 | Tm2 (° C.) | Heat of Fusion Tm2 |
|---|---|---|---|---|---|---|---|
| 5 | 1 | 54.7 | | 106.5 | | 137-180 | noisy |
|  | 2 | 44.4 | | 114.1 | | | |
| 5A | 1 | 48.3 | | 107 | | 152, 180, 207 | 23.5 (152-180), 2.26 (207) |
|  | 2 | 69.7 | | 115 | | | |
| 6 | 1 | 47.7, 79.3 | 2.1, 2.4 | 132 | 6.1 | 155.9 | 4.1 |
|  | 2 | 83.1 | | 117 | | 153 | |
| 6A | 1 | | | Not measured | | | |
|  | 2 | | | | | | |
| 7 | 1 | 51.2 | | 112.8 | 5.93 | | |
|  | 2 | | | 120.2 | | | |
| 7A | 1 | 48.4 | | 116.5 | 4.48 | | |
|  | 2 | | | 119.5 | | | |
| 10 | 1 | 51.1 | 1 | 109.35 | 6.1 | | |
|  | 2 | 49.8 | | 109.6 | | | |
| 10A | 1 | 55 | 1.6 | 105.2 | 6.9 | | |
|  | 2 | 57.6 | | 109.2 | | | |
| 11 | 1 | 50.8 | 1.4 | 102.7 | 6.9 | | |
|  | 2 | 54 | 1.8 | 109.2 | 5.4 | | |
| 11A | 1 | 51.9 | 1.4 | 77.8, 103.9, 109.7 | 7 (all 3 peaks) | | |
|  | 2 | 55 | 1.4 | 110.7 | 4.6 | | |
| 8 | 1 | 50.6 | 1.6 | 110.8 | 6.4 | | |
|  | 2 | 59.2 | 1.4 | 112.8 | 4.7 | | |

TABLE 4E

| Polymer Film ID No. | Tm (highest) − Tm (2nd cycle) | Extra Heat Resistance Brought by Orientation |
|---|---|---|
| 1 | 7.4 | |
| 1A | 10 | 2.6 |
| 2 | 6.9 | |
| 3 | 10.4 | 3.5 |
| 3A | 8.5 | −1.9 |
| 4 | 12.3 | |
| 4A | 9 | −3.3 |
| 5 | 22.9 | |
| 5A | 37 | 14.1 |
| 6 | 20 | |
| 6A | | Not determined |
| 7 | −7.4 | |
| 7A | −3 | 4.4 |
| 10 | −0.25 | |
| 10A | −4 | −3.75 |
| 11 | −6.5 | |
| 11A | −1 | −2.5 |

As seen from Tables 4A-4E, in all cases except for the ECOFLEX® films (ID's 10 and 11) the calendered films exhibit the unusual higher peak melting temperature (Tm2), which was not seen in any of the melt-cast films (Film ID Nos. 7 and 7A), or melt-blown films of AAPE or ECOFLEX® copolyester. Further, these calendered films have good optical properties when compared to films made via melt-casting or melt-blown processes, which require the use of anti-block additives (e.g., talc, CaCO₃). The use of anti-block additives results in poorer optical properties as indicated by the higher haze values. Higher clarity was observed for all blends and calendered resins/blends shown, except the AAPE copolyester/starch blends after orientation.

In this latter example, the orientation step may have caused some microvoiding which resulted in higher size values.

The physical properties of certain films containing the AAPE copolyester are compared in detail in Tables 5A-5D. Where multiple peak melting point values (Tm1 and Tm2) are shown in a single table cell, the individual values from the DSC curve were not separated.

TABLE 5A

| Polymer Film ID No. | Direction of Measure | Thickness (in) | Thickness Ratio o/u | 60° Gloss | % Haze | Tg (° C.) |
|---|---|---|---|---|---|---|
| 3 | MD | 0.00714 | | 14.2 | 29.2 | −35.4 |
|  | TD | 0.00909 | | | | |
| 5 | MD | 0.01011 | | 18.8 | 41.9 | −33.3 |
|  | TD | 0.01072 | | | | |
| 7 | MD | 0.01042 | | 27.6 | 83.5 | −33.1 |
|  | TD | 0.01007 | | | | |
| 8 | MD | 0.00857 | | 63 | 18.1 | −32.6 |
|  | TD | 0.00978 | | | | |
| 3A | MD | 0.00234 | 0.33 | 72.2 | 2.8 | −34.5 |
|  | TD | 0.00240 | 0.26 | | | |
| 5A | MD | 0.00296 | 0.29 | 10.4 | 63.3 | −33.4 |
|  | TD | 0.00280 | 0.26 | | | |
| 7A | MD | 0.00323 | 0.31 | 17.2 | 77.5 | −32.9 |
|  | TD | 0.00317 | 0.31 | | | |

TABLE 5B

| Polymer Film ID No. | DSC Heat Cycle | Tc (° C.) | Heat of Fusion Tc | Tm1 (° C.) | Heat of Fusion Tm1 | Tm2 (° C.) | Heat of Fusion Tm2 | Tm (highest) − Tm (2$^{nd}$ cycle) |
|---|---|---|---|---|---|---|---|---|
| 3 | 1 | 49.8 | 1.2 | 100.6 | 6 | 123.1 | 0.9 | 10.4 |
|   | 2 | 63.4 |     | 112.7 |   |       |     |      |
| 5 | 1 | 54.7 |     | 106.5 |   | 137-180 | noisy | 22.9 |
|   | 2 | 44.4 |     | 114.1 |   |       |       |      |
| 7 | 1 | 51.2 |     | 112.8 | 5.93 |    |       | −7.4 |
|   | 2 |      |     | 120.2 |   |       |       |      |
| 8 | 1 | 50.6 | 1.6 | 110.8 | 6.4 |     |       |      |
|   | 2 | 59.2 | 1.4 | 112.8 | 4.7 |     |       |      |
| 3A | 1 | 50.9 | 1.8 | 109.9 | 6.9 all | 123 |   | 8.5 |
|    | 2 | 60.3 |     | 114.5 |   |       |       |      |
| 5A | 1 | 48.3 |     | 107   |   | 152, 180, 207 | 23.5 (152-180), 2.26 (207) | 37 |
|    | 2 | 69.7 |     | 115   |   |       |       |      |
| 7A | 1 | 48.4 |     | 116.5 | 4.48 |  |       | −3 |
|    | 2 |      |     | 119.5 |   |       |       |      |

TABLE 5C

| Polymer Film ID No. | Direction of Measure | Young's Modulus (psi) | Young's Modulus Ratio o/u | Yield Strain (%) | Yield Strength Ratio o/u | Yield Stress (psi) | Yield Stress Ratio o/u |
|---|---|---|---|---|---|---|---|
| 3 | MD | 7376 |  | 26.0 |  | 917 |  |
|   | TD | 6091 |  | 50.5 |  | 603 |  |
| 5 | MD | 22412 |  | 20.8 |  | 1414 |  |
|   | TD | 20223 |  | 16.8 |  | 1076 |  |
| 7 | MD | 19377 |  | 18.5 |  | 1183 |  |
|   | TD | 17611 |  | 16.0 |  | 1151 |  |
| 8 | MD | 10742 |  | 28.0 |  | 1110 |  |
|   | TD | 9275 |  | 18.0 |  | 921 |  |
| 3A | MD | 10987 | 1.5 | 52.7 | 2.0 | 4411 | 4.8 |
|    | TD | 9589 | 1.6 | 17.8 | 0.4 | 796 | 1.3 |
| 5A | MD | 18409 | 0.8 | 63.3 | 3.0 | 5009 | 3.5 |
|    | TD | 15147 | 0.7 | 16.7 | 1.0 | 1047 | 1.0 |
| 7A | MD | 12039 | 0.6 | 44.2 | 2.4 | 4221 | 3.6 |
|    | TD | 9636 | 0.5 | 22.6 | 1.4 | 841 | 0.7 |

As seen from Tables 5A-5D, the physical properties of the calendered films (Film ID Nos. 3 and 5) are not as good as in the melt-cast films (Film ID Nos. 7 and 8). However, the physical properties of the oriented calendered films (Film ID Nos. 3A and 5A) improved to the point that their physical properties are comparable to those of the oriented melt-cast film (Film ID No. 7A) even though it is known that the 10% talc additive enhances the physical properties of the AAPE and other biodegradable polyesters in melt-cast films. Improving Young's modulus by adding inert fillers is a well-known phenomenon. In view of this phenomenon, achieving comparable physical properties without the use or addition of 10% by weight of talc, which is used (for anti-blocking purposes) in the melt-cast film, was unexpected. In the case of the oriented calendered films of the AAPE-starch blend (Film ID No. 5A), the physical property profile is better than the melt-cast oriented film (Film ID No. 7A).

This invention has been extended from neat AAPE and other biodegradable resins such as ECOFLEX® and to blends of these biodegradable polyesters with starch and with polylactic acid. In each case, the improved strength enhancement from orientation and the presence of the higher melting point component was observed (with the exceptions noted above).

TABLE 5D

| Polymer Film ID No. | Direction of Measure | Break Strength (%) | Break Strength Ratio o/u | Break Stress (psi) | Break Stress Ratio o/u | Energy/Vol @ Break (lb/in$^2$) | Energy/Vol @ Break Ratio o/u |
|---|---|---|---|---|---|---|---|
| 3 | MD | 549 |  | 2015 |  | 731 |  |
|   | TD | 464 |  | 1103 |  | 326 |  |
| 5 | MD | 462 |  | 1915 |  | 627 |  |
|   | TD | 517 |  | 1414 |  | 500 |  |
| 7 | MD | 986 |  | 3533 |  | 1605 |  |
|   | TD | 884 |  | 2986 |  | 1287 |  |
| 8 | MD | 773 |  | 2988 |  | 1164 |  |
|   | TD | 891 |  | 3112 |  | 1255 |  |
| 3A | MD | 272 | 0.5 | 8746 | 4.3 | 1282 | 1.8 |
|    | TD | 770 | 1.7 | 1895 | 1.7 | 768 | 2.4 |
| 5A | MD | 151 | 0.3 | 6655 | 3.5 | 635 | 1.0 |
|    | TD | 439 | 0.8 | 1503 | 1.1 | 459 | 0.9 |
| 7A | MD | 215 | 0.2 | 9537 | 2.7 | 1088 | 0.7 |
|    | TD | 746 | 0.8 | 2155 | 0.7 | 832 | 0.6 |

We claim:

1. A calendered film made from a polyester composition comprising an aliphatic-aromatic polyester (AAPE) having a crystallization half-time from a molten state of less than 5 minutes and a release additive in an amount effective to prevent sticking of the polyester composition to calendering rolls.

2. The film according to claim 1, wherein said AAPE has a crystallization half-time from a molten state of less than 3 minutes.

3. The film according to claim 1, wherein said AAPE comprises:
   (a) diacid residues comprising (i) about 35 to about 95 mole % of the residues of one or more non-aromatic dicarboxylic acids selected from glutaric acid, diglycolic acid, succinic acid, 1,4-cyclohexandicarboxylic acid, and adipic acid, and (ii) about 5 to about 65 mole % of the residues of one or more aromatic dicarboxylic acids selected from terephthalic acid and isophthalic acid, based on the total moles of diacid residues; and
   (b) diol residues comprising the residues of 1,4-butanediol; 1,3-propanediol; ethylene glycol; 1,6-hexanediol; diethylene glycol; 1,4-cyclohexanedimethanol, or mixtures thereof.

4. The film according to claim 1, wherein said AAPE comprises:
   (a) diacid residues comprising adipic acid residues and 65 mole percent or less of terephthalic acid residues, based on the total moles of diacid residues; and
   (b) diol residues comprising 1,4-butanediol residues.

5. The film according to claim 4, wherein said diacid residues comprise about 50 to about 60 mole percent of the residues of adipic acid and about 40 to about 50 mole percent of the residues of terephthalic acid, based on the total moles of diacid residues; and said diol residues comprise from about 95 to 100 mole percent of the residues of 1,4-butanediol, based on the total moles of diol residues.

6. The film according to claim 1, wherein said polyester composition comprises about 0.1 to about 2.0 weight percent of the release additive, based on the total weight of said film.

7. The film according to claim 6, wherein said release additive is selected from the group consisting of erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, and glycerol distearate.

8. The film according to claim 6, wherein said release additive comprises a fatty acid or a salt of a fatty acid containing more than 18 carbon atoms and an ester wax comprising a fatty acid containing more than 18 carbon atoms with an alcohol containing 2 to 28 carbon atoms.

9. The film according to claim 1, wherein said polyester composition is substantially free of plasticizer.

10. The film according to claim 1, wherein said polyester composition further comprises one or more additional polyesters selected from the group consisting of polycaprolactone, polylactic acid, polybutylenesuccinate, polyhydroxybutyrate, polyhydroxybutyrate-valerate, and copolymers thereof.

11. The film according to claim 1, which further comprises starch or talc.

12. The film according to claim 11, wherein said starch is a thermoplastic starch.

13. The film according to claim 1, wherein said film is free of antiblocking additives.

14. The film according to claim 1, which has been oriented.

15. A polyester composition for calendering comprising an aliphatic-aromatic polyester (AAPE) having a crystallization half-time from a molten state of less than 5 minutes and a release additive in an amount effective to prevent sticking of the polyester composition to calendering rolls.

16. The composition according to claim 15, wherein said AAPE has a crystallization half-time from a molten state of less than 3 minutes.

17. The composition according to claim 15, wherein said AAPE comprises:
   (a) diacid residues comprising (i) about 35 to about 95 mole % of the residues of one or more non-aromatic dicarboxylic acids selected from glutaric acid, diglycolic acid, succinic acid, 1,4-cyclohexandicarboxylic acid, and adipic acid, and (ii) about 5 to about 65 mole % of the residues of one or more aromatic dicarboxylic acids selected from terephthalic acid and isophthalic acid, based on the total moles of diacid residues; and
   (b) diol residues comprising the residues of 1,4-butanediol; 1,3-propanediol; ethylene glycol; 1,6-hexanediol; diethylene glycol; 1,4-cyclohexanedimethanol, or mixtures thereof.

18. The composition according to claim 15, wherein said AAPE comprises:
   (a) diacid residues comprising adipic acid residues and 65 mole percent or less of terephthalic acid residues, based on the total moles of diacid residues; and
   (b) diol residues comprising 1,4-butanediol residues.

19. The composition according to claim 18, wherein said diacid residues comprise about 50 to about 60 mole percent of the residues of adipic acid and about 40 to about 50 mole percent of the residues of terephthalic acid, based on the total moles of diacid residues; and said diol residues comprise from about 95 to 100 mole percent of the residues of 1,4-butanediol, based on the total moles of diol residues.

20. The composition according to claim 18, which comprises about 0.1 to about 2.0 weight percent of the release additive.

21. The composition according to claim 20, wherein said release additive is selected from the group consisting of erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, and glycerol distearate.

22. The composition according to claim 20, wherein said release additive comprises a fatty acid or a salt of a fatty acid containing more than 18 carbon atoms and an ester wax comprising a fatty acid containing more than 18 carbon atoms with an alcohol containing 2 to 28 carbon atoms.

* * * * *